United States Patent [19]
Pleasant

[11] Patent Number: 5,261,806
[45] Date of Patent: Nov. 16, 1993

[54] ELECTRICALLY HEATED MOLD INSERT

[76] Inventor: Ronald E. Pleasant, 13191 Township Rd. 184, Kenton, Ohio 43326

[21] Appl. No.: 842,875

[22] Filed: Feb. 26, 1992

[51] Int. Cl.$^5$ .................. B29C 33/02; B29C 45/72
[52] U.S. Cl. .................. 425/144; 425/183; 425/192 R; 425/543; 425/547; 425/556
[58] Field of Search .................. 249/78; 425/41, 547, 425/DIG. 13, 143, 144, 183, 192 R, 195, 547, 407, 278.1, 543, 556; 264/27; 219/531

[56] References Cited

U.S. PATENT DOCUMENTS

| | | | |
|---|---|---|---|
| 4,201,742 | 5/1980 | Hendry | 425/547 |
| 4,238,105 | 12/1980 | West | 249/78 |
| 4,314,765 | 2/1982 | Hotz | 425/203 |
| 4,659,304 | 4/1987 | Day | 425/DIG. 13 |
| 4,828,479 | 5/1989 | Pleasant | 425/192 R |
| 4,959,002 | 9/1990 | Pleasant | 425/192 R |

OTHER PUBLICATIONS

1986 D-M-E Catalog published 1985 by D-M-E Company, Madison Heights, MI, pp. A-1, L-2, L-6, L-7 and back spine of binder included.

Primary Examiner—Khanh P. Nguyen
Attorney, Agent, or Firm—Roger S. Dybvig

[57] ABSTRACT

A master frame supports interchangeable mold inserts, each of which is provided with its own electrical heater and associated wiring. A recess is provided in the master frame to allow for lateral movement of the wiring, heater and mold inserts as a unit during installation and replacement. A closure member in the form of a thermocouple retainer is provided to support a temperature-controlling thermocouple inwardly of a hole within each mold insert as well as to close the recess during a molding operation.

16 Claims, 2 Drawing Sheets

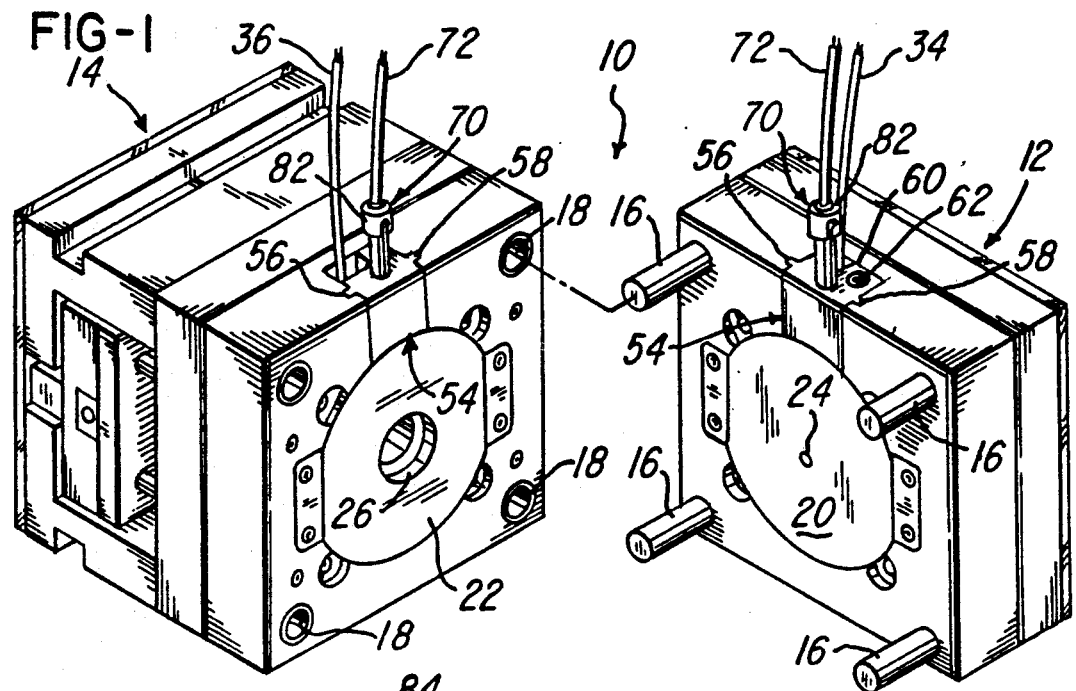
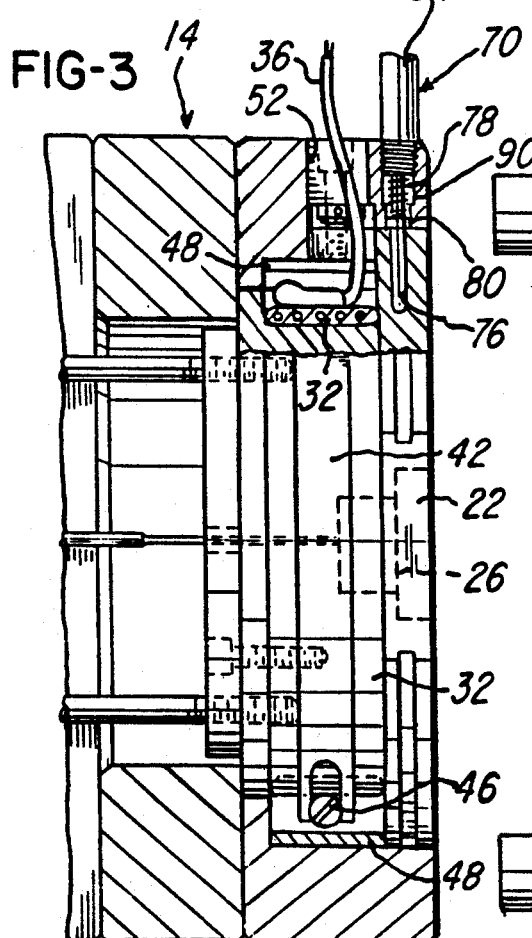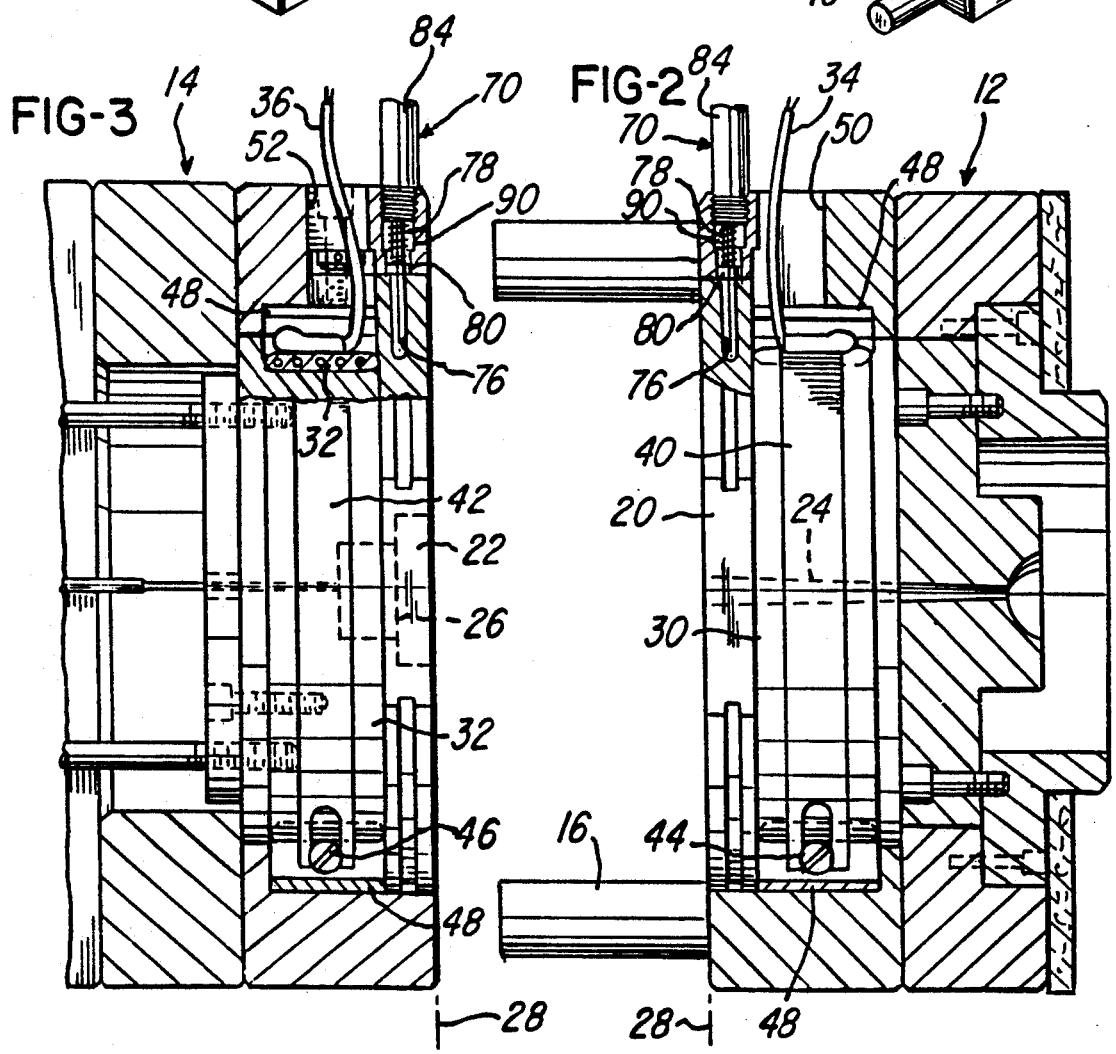

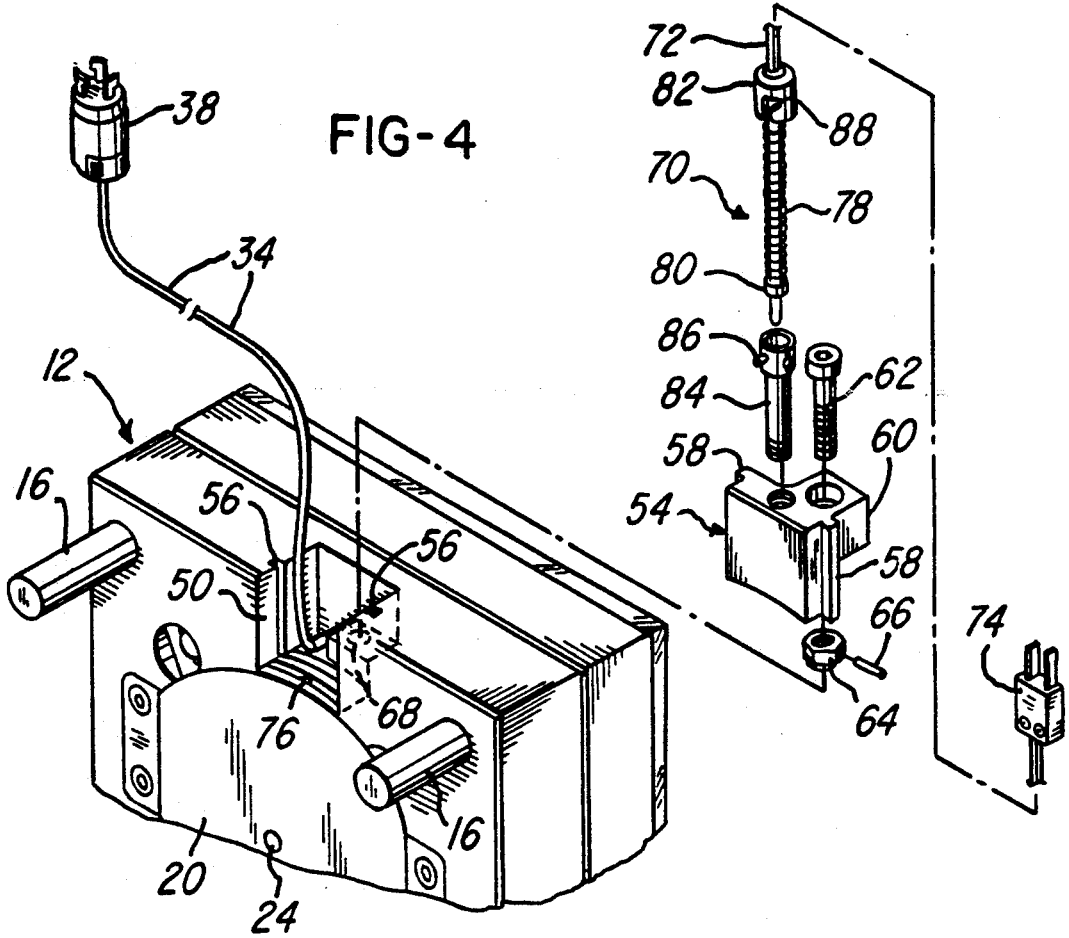
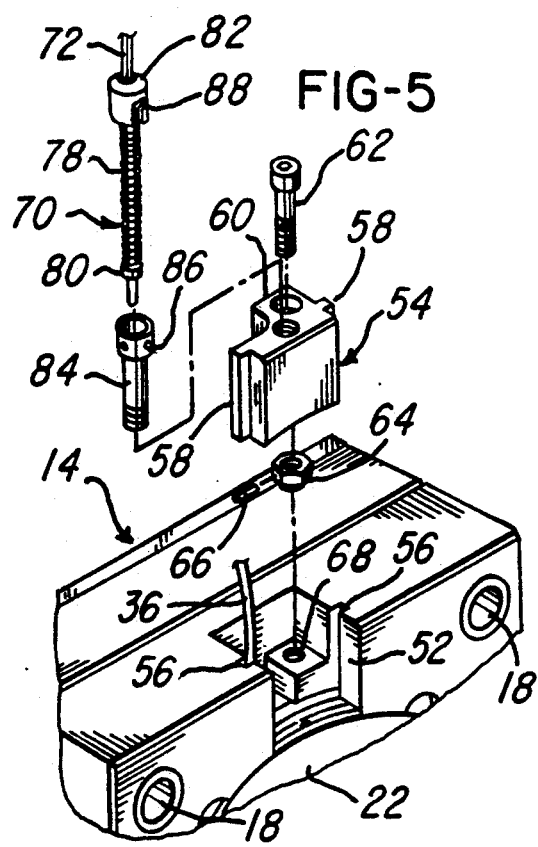
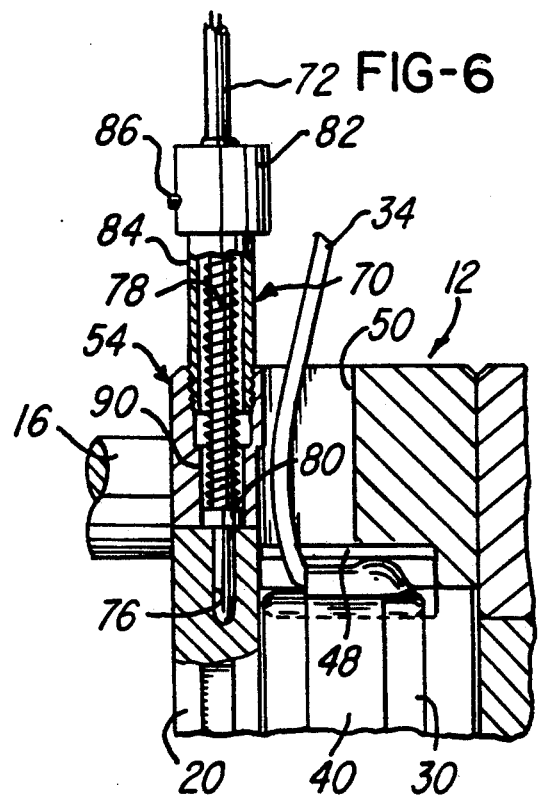

ELECTRICALLY HEATED MOLD INSERT

This invention relates generally to a molding system for producing thermosetting resin molded products, and in particular to a system which employs electrically-heated mold inserts which may be easily and quickly installed in and removed from a master frame.

BACKGROUND OF THE INVENTION

A mold system which employs interchangeable inserts for producing different molded parts is disclosed in my U.S. Pat. No. 4,828,479, issued on May 9, 1989. In that patent, I disclose a master frame which consists of an injection side and an ejection side each with its own interchangeable insert, and which, when the sections of the master frame are assembled in molding condition, produce molded pieces one at a time. The frame sides are separable along a parting line or plane for molded part removal. Each of the inserts is provided with a liquid channel and means is provided for pumping liquid through the channel from an external liquid coolant or heater source.

Obviously, when changing from one production job to another, removal of one or more of the inserts requires the liquid flow to be discontinued during replacement. More importantly, using liquid for heating has limitations, particularly when used for molding thermosetting plastic materials which require temperatures on the order of 400 to 600 degrees Fahrenheit. It is known to use electrical heater bands for heating molds, but if heater bands were employed with an interchangeable mold insert system such as that disclosed in my aforementioned '479 patent, the wiring connections to the heater bands would present a problem during replacement of inserts. The electrical connections to the bands would have to be disconnected, or if left intact, the bands would have to be separated from the inserts. Otherwise, if the bands and wires were to remain with their individual inserts, the wires would have to be "snaked" through openings in the master frame. It is avoidance of these problems which is addressed by the present invention. The solution adapts the disclosed type of molding system for electrical heating of the mold inserts and thereby provides for improved molding operations in connection with molding of thermosetting plastics.

SUMMARY OF THE INVENTION

In accordance with this invention, mold inserts having heater bands and their electrical wiring leads affixed to the inserts are interchangeably mounted in a master frame, while maintaining the heaters and their wiring intact with the inserts during replacement. The heaters and their wiring become permanent parts of each insert and can be removed or installed as a unit. The unit also consists of plugs at the ends of the wiring remote from the heating element, for attachment to controls and a power source.

To accommodate replacement of such units, there is provided a closable recess that extends from the bore or cavity which receives the mold insert, to an outer portion of the master frame. The recess permits passage of the wiring heater band into and out of the recess laterally whenever the recess is open. When the parts are in molding condition, the recess is covered by a closure member which is preferably guided essentially radially inward from the outer edge of the master frame toward the bore. The closure member is then fastened to a portion of the master frame to become a part of the frame during molding.

Since it is necessary to closely maintain the mold insert at a preselected temperature according to the thermosetting material being molded, a temperature-controlling thermocouple is provided. The thermocouple has a temperature-sensing end or tip which extends into a hole in the insert during molding. By mounting the thermocouple in the recess closure member, the tip of the thermocouple can be directed into the insert hole as the closure member is placed into position. This manner of thermocouple mounting also insures that the thermocouple tip is removed from the mold insert prior to lateral removal of the insert from its cavity. Parts interference would occur if the thermocouple were not removed first, and this invention eliminates the need for an operator to remember to first remove the thermocouple. Thus, the recess closure member is also a thermocouple retainer in the preferred form of the invention. The retainer serves not only to open or close the recess for lateral movement of the wiring into and out of the bore or cavity along with the mold insert and heater, but it also places the tip of the thermocouple into and out of operative, temperature-sensing position.

The retainer can support the thermocouple permanently, so that the same thermocouple can be employed when changing to a different mold insert. The heater band wiring is free of or unconnected to the retainer, so that each mold insert can be kept intact with the heater band and its wiring and plug, and be independent of the retainer. Preferably, the internal cavity of the master frame adjacent the external surface of the heater band, when the insert is mounted in operative condition, is provided with a heat insulating band. This minimizes heat transfer outwardly into the master frame. Insulating means can also be provided at external surfaces of the master frame to prevent dissipation of heat from the frame to the surrounding atmosphere. This not only provides for better heat retention within the mold insert, but also conserves electrical energy.

The primary object of the invention is to provide a molding system having interchangeable mold inserts and an electrical heater and associated wiring for each of the mold inserts, each heater, wiring and insert being easily removed from or installed in a master frame section as a unit.

A more specific object of my invention is to provide a recess or channel from a cavity of a master frame to its external surface, and to further provide a thermocouple retainer which serves to close the recess and simultaneously install the thermocouple internally of the mold insert.

Other objects and advantages will be apparent from the accompanying description in which reference is made to the accompanying drawings.

BRIEF DESCRIPTION OF THE DRAWINGS

FIG. 1 is an isometric view of a pair of mold master frame sections separable along a parting plane, each section having its own mold insert and means for electrically heating the inserts.

FIG. 2 is a vertical view, partly in cross-section, of the injection side of the mold shown at the right side of FIG. 1.

FIG. 3 is a vertical view, partly in cross-section, of the ejection side of the mold shown at the left side of FIG. 1.

FIG. 4 is a fragmentary, exploded, isometric view illustrating a mold insert and its wiring positioned in the injection side of master frame and also illustrating details of the elements of the thermocouple retainer.

FIG. 5 is a view similar to that of FIG. 4 but showing the ejection side of the master frame and the thermocouple retainer.

FIG. 6 is an enlarged fragmentary, vertical cross-sectional view of the retainer and thermocouple in their operative positions in the injection side of the mold.

DETAILED DESCRIPTION

Referring now to FIG. 1, the master frame 10 consists of two sections comprising an injection side 12 and an ejection side 14. The sides 12 and 14 are shown in separated fashion, and when assembled for molding, pins 16 in side 12 fit into holes 18 in side 14 to align the master frame sections. An injection mold insert 20 is mounted in the injection side 12, and an ejection mold insert 22 is mounted in ejection side 14 in a manner disclosed in my U.S. Pat. No. 4,828,479. When the pins 16 are engaged in the holes 18, the two sides 12 and 14 can be held together in conventional fashion. The two assembled sides 12 and 14 thus become the master frame 10, enabling the hot thermosetting material to be used with this invention to pass from side 12 through a hole 24 into a part cavity 26 formed in the ejection mold insert 22. When the sides 12 and 14 are together, it will be seen that the faces of the two inserts 20 and 22 and the surrounding area of the injection and ejection sides 12 and 14 lie in a common plane which will be designated hereinafter as a parting plane 28. (FIGS. 2 and 3.) The mutually confronting surfaces of the inserts 20 and 22 will be in contact and lie in the parting plane 28 except for cavities therein, such as cavity 26, that determine the shapes of the parts to be molded.

For uniform heat distribution and maintenance at a preset temperature, the mold inserts are heated by band heaters 30 and 32 which are wrapped snugly around the cylindrical recessed portions of their respective inserts for efficient heat transfer to the inserts. The heater bands or heaters are supplied with electricity through wiring 34 and 36, which are adapted to be plugged into a power supply (not shown). Each heater and associated wiring and electrical plug 38 (FIG. 4) is kept together as a single unit. Each heater band is preferably kept intact with its mold insert by fastening it thereto by means of clamps 40 and 42 with respective screws 44 and 46 in conventional fashion. Since the heaters, clamps, wiring and plugs are the same for each insert, a description of one will suffice for both. The clamps, the screws and the heaters are known in the molding art. A further detailed description is therefore unnecessary.

Although not essential, I prefer to employ use of an insulator element 48 internally of each cylindrical bore or insert cavity for receiving the mold inserts. The inner surface of the insulator 48 is spaced a small distance from the outer surface of the heater and clamps to provide clearance for installation and removal of the inserts. Insulators 48 occupy essentially most of the internal peripheral portion of the bore, i.e., all but that portion where the wires 34 and 36 pass through channels or recesses 50 and 52 machined in the injection and ejection sides 12 and 14 respectively. Recess 50 is depicted in its open condition in FIG. 4, showing how wiring 34 passes upwardly from its heater through a portion of the recess 50. The area where the wiring 34 attaches to its heater remains uncovered by insulator 48, allowing for passage of the wiring 34 through the insulator.

Referring primarily to FIG. 4 and FIG. 2, the recess 50, when all parts are in molding position, is closed by a recess closure means, hereinafter referred to as a thermocouple retainer 54. The retainer 54 is moved essentially radially with respect to the mold insert 20 and is guided in its movement by tongue-and-groove ways on opposite sides of the recess 50. While any of several types of ways may be used, I show them in the form of female guide slots 56 and male guide rails 58. The retainer is provided with a lug portion 60 through which a bolt 62 passes freely. Bolt 62 has a lock nut 64 fastened to it below the lug 60 by means of a dowel pin 66. The lock nut 64 serves as a collar to retain bolt 62 with the retainer 54 whenever the retainer has been separated from the master frame 10. A threaded hole 68 is provided in a shoulder in the master frame to receive the threaded end of the bolt 62 when the retainer 54 closes the recess 50.

In order to sense and maintain proper temperature of the mold inserts, a thermocouple 70 is provided. The thermocouple is connected to a temperature controller (not shown) by means of wiring 72 and a plug 74. For maximum efficiency of operation of the thermocouple 70, its tip is designed to protrude inwardly of the mold insert into a drilled hole 76. Because of the fact that the thermocouple extends inwardly of an insert, it is essential that the thermocouple must be removed from operative position whenever a mold insert is being removed or installed relative to its frame section. To avoid the possibility of the operator causing damage to the thermocouple by removing an insert while the end of the thermocouple 70 is still in the hole 76, the thermocouple is mounted in the retainer 54. Since it is already essential to remove the retainer 54 from the channel 50 in order to permit the wiring 34 to be removed laterally as the insert is moved from its frame section, removal of the retainer in the outward direction along the way provided by slots 56 and rails 58 also withdraws the tip of the thermocouple 70 from the hole 76. This not only minimizes the number of operations necessary to make a change of mold inserts, but it also reduces the risk of damage to a thermocouple by an inattentive operator if the thermocouple were separate from the retainer 54.

The thermocouple and its associated attaching elements are shown in enlarged fashion in FIG. 6, which will now be described. It will be seen that the outer tip of the thermocouple extends inwardly of the mold insert 20 and bottoms in the hole 76. Bottoming is assured by a compression spring 78 which is seated between a shoulder 80 integral with the thermocouple 70 approximately one-half inch inwardly from its end. The opposite end of the spring 78 fits against the internal shoulder of a bayonet cap 82 fastened onto a hollow tube 84 threaded into the outer surface of the retainer 54. Tube 84 has a radially-extending pin 86 which is received in a conventional L-shaped bayonet slot 88 (FIG. 4) provided in cap 82. The same thermocouple is used for replacement of a given mold insert, and, except for replacement of a defective thermocouple on occasion, tube 84, bayonet cap 82, and spring 78 become permanent parts of their respective retainer 54. The shoulder 80 can pass freely through a drilled hole 90 in the retainer 54. When the retainer 54 is removed from the master frame, the tip of the thermocouple 70 is biased outwardly of the retainer 54 by the compression spring 78. This provides a spring bias so that the tip of the thermocouple 70 bottoms in the hole 76 when the retainer 54 is reinstalled into its master frame section after a new mold insert has been placed in position. The bottoming provides for effective temperature sensing and control of the insert during the molding operation.

It will be seen that I have provided for ease of replacement of heated mold inserts with their wiring and heating elements intact, enabling them to be laterally moved through an essentially radial recess which is provided when the retainer 54 has been removed. It will also be seen that one can utilize the retainer 54 to mount a thermocouple in order to simplify the operation by manipulation of a single bolt 62 to not only remove the thermocouple but also to provide the recess through which the wiring of the heater can pass freely.

Various modifications may be made in the details of the parts without departing from the spirit and scope of the claims.

Having described my invention, I claim:

1. Molding apparatus for thermosetting plastic material, consisting of a master frame having an injection side and an injection side connected therewith when in molding condition, said sides being separable along a parting plane and at least one of said sides having an insert cavity for receiving and mounting a heat-conducting mold insert therein, the improvement comprising:
   an electric resistance heater in heat-conducting contact with and essentially surrounding the mold insert, said heater being located inwardly of said parting plane and within the cavity,
   electrical supply means exteriorly of said master frame for supplying electrical energy to said heater,
   electrical wiring connecting said heater to said supply means,
   a recess in said at least one of said sides extending outwardly from the insert cavity therein to an outer surface of the master frame, said recess having a depth extending inwardly from the parting plane, which depth enables passage of the wiring from the heater to said outer surface and which further enables lateral installation and removal of said insert, said heater and said wiring as a unit relative to the parting plane,
   a section of said electrical wiring extending through said recess from said heater to said outer surface,
   a recess closure member partly filling said recess and confining said section of said electrical wiring in said recess, and
   means for removably mounting the recess closure member in said recess,
   said recess closure member forming a portion of said at least one side of said master frame during molding.

2. Molding apparatus according to claim 1 wherein the recess closure member, when installed in said recess, has one side coplanar with said parting plane.

3. Molding apparatus according to claim 2 wherein the recess closure member and said recess are provided with cooperating guide means for enabling inward and outward movement of the closure member parallel to the parting plane.

4. Molding apparatus according to claim 3 wherein said guide means consists of guide slots in opposing recess sides and guide rails on corresponding opposing closure member sides.

5. Molding apparatus according to claim 1 including a thermocouple mounted in said recess closure member that controls said heater to maintain said insert at a predetermined temperature during molding.

6. Molding apparatus according to claim 5 wherein said insert has an outer surface provided with an inwardly-directed hole adjacent the recess, and wherein at least a portion of the thermocouple extends into and bottoms in said hole when the closure member is mounted on said frame.

7. Molding apparatus according to claim 1 including a heat insulator interposed between the heater and the adjacent inner surface of the insert cavity.

8. Molding apparatus according to claim 7 wherein said heat insulator is mounted inside said insert cavity independently of said insert.

9. Molding apparatus according to claim 1 wherein said insert is essentially cylindrical and said heater is an elongated, flexible flat band wrapped about a major portion of the periphery of the insert.

10. Molding apparatus according to claim 9 wherein said insert has an inwardly-directed hole of a predetermined depth at its periphery in general alignment with said recess, and wherein an elongated thermocouple is mounted on said recess closure member with the end of said thermocouple protruding beyond the inner end of the closure member and into said hole when the apparatus is in molding condition.

11. Molding apparatus according to claim 10 wherein the means for mounting the closure member on the master frame comprises bolt means for fastening the closure member to said at least one side of the master frame when the closure member is assembled in molding condition.

12. Molding apparatus according to claim 11 including a compression spring surrounding the thermocouple within the recess closure member, said spring biasing the thermocouple toward the bottom of said hole when said closure member is assembled in molding condition.

13. Molding apparatus according to claim 1 wherein an insert cavity, an insert, an identical heater and wiring, recess, recess closure member and a closure mounting means are provided for each of said injection and ejection sides.

14. Molding apparatus according to claim 13 wherein a thermocouple having a temperature-sensing tip is provided in each of said recess closure members and wherein the tip of each thermocouple protrudes inwardly into direct contact with the mold insert carried by its side.

15. Molding apparatus according to claim 14 wherein each mold insert is provided with an inwardly-directed hole adjacent its associated recess, wherein the tip of each thermocouple protrudes into its associated mold insert hole, and wherein spring means biases each of said thermocouples to bottom said tips in their respective holes.

16. Molding apparatus according to claim 13 wherein said recess closure members are interchangeable for either the injection or ejection sides of the master frame.

* * * * *

UNITED STATES PATENT AND TRADEMARK OFFICE
CERTIFICATE OF CORRECTION

PATENT NO. : 5,261,806
DATED : November 16, 1993
INVENTOR(S) : Ronald E. Pleasant It is certified that error appears in the above-indentified patent and that said Letters Patent is hereby corrected as shown below:

Column 5, line 24, in claim 1, "injection" should read --ejection--.

Signed and Sealed this

Second Day of July, 1996

Attest:

BRUCE LEHMAN

Attesting Officer     Commissioner of Patents and Trademarks